2,789,534

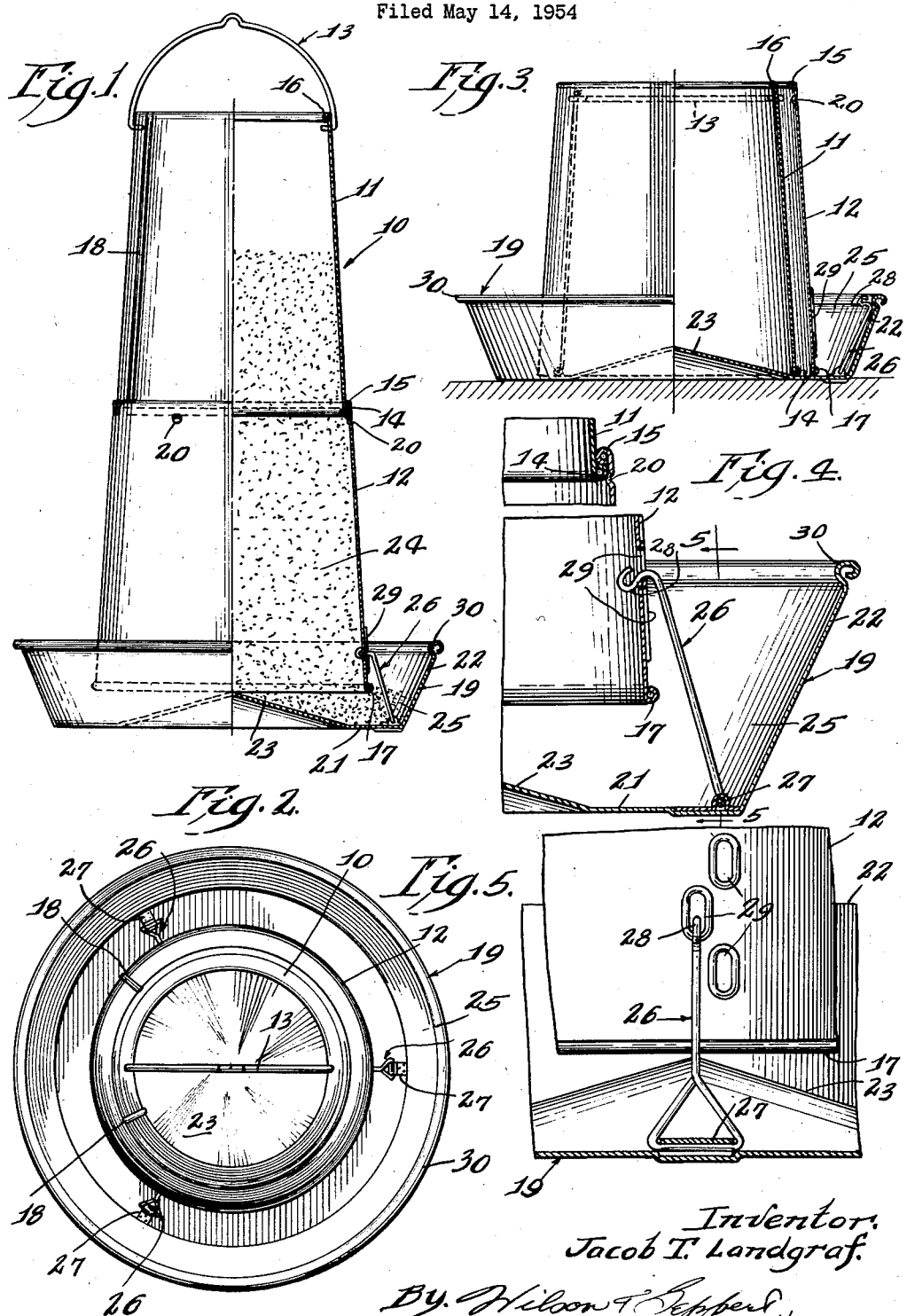
April 23, 1957 — J. T. LANDGRAF — 2,789,534
HANGING HOPPER WITH ADJUSTABLY SUSPENDED FEEDING TROUGH
Filed May 14, 1954
Inventor:
Jacob T. Landgraf
By Wilson & Jeppert
Attorneys United States Patent Office 2,789,534
Patented Apr. 23, 1957

HANGING HOPPER WITH ADJUSTABLY SUSPENDED FEEDING TROUGH

Jacob T. Landgraf, Freeport, Ill., assignor to H. D. Hudson Manufacturing Company, Chicago, Ill., a corporation of Minnesota Application May 14, 1954, Serial No. 429,727

3 Claims. (Cl. 119—52)

The present invention relates to a novel device for feeding chickens and other fowl and adapted to be hung or mounted in a suspended position above the floor to facilitate cleaning of any litter without moving the feeding device.

Among the objects of the present invention is the provision of a novel hanging feeding device for chickens or other fowl comprising a hopper for containing the feed to be dispensed and having telescoping sections of frusto-conical shape which when moved to extended position automatically interlock to provide an elongated hopper of substantial capacity, and a feeding pan suspended from the hopper in spaced relation to the lower open end of the hopper to provide an adjustable passage therebetween for supplying and conducting feed or grit from the hopper to the pan by gravity.

The invention further comprehends the provision of a novel means and manner of adjustably connecting the feed pan to the feed hopper whereby to adjust the flow of feed for different kinds and for different sizes of chickens or birds. In the novel embodiment disclosed, the hopper and base of the pan are so formed or contoured as to provide a continuous passage for the feed that may be adjusted through a relatively wide range to handle any type or kind of feed or grit.

A further object of the present invention is the provision of a novel hanging feeder adapted to be mounted and suspended above the floor and comprising a hopper tapered from its upper end outwardly and downwardly to its lower end whereby to assure a free flow of the contained feed and to prevent any clogging of the feed contained therein, and a pan carried by and vertically adjustable on the lower end of the hopper for receiving the feed to be dispensed, the lower open end of the hopper and the base of the pan being so constructed and arranged that the contents of the hopper are automatically fed to the feed pan by gravity in predetermined amounts in accordance with the quantity of feed in the pan, and in such manner that the feed initially fed to the pan must be eaten before a fresh supply is fed thereto.

Another object of the present invention is the provision of a novel assembly of a hanging feeder adapted to be suspended and supported above the floor in a poultry house, comprising separable parts including a feeding pan and telescoping sections which when extended form a hopper for the feed to be dispensed. When so extended and mounted in suspended position, these sections automatically interengage or interlock and when collapsed are capable of being compacted into a relatively small shipping space. The outer diameter and the feeding space of the feeding pan being substantially greater than the diameter of the adjacent end of the lower telescoping section of the hopper from which the pan is suspended, provides an adjustable, annular discharge opening for the passage of the feed to be dispensed between the lower end of the hopper and the bottom of the pan. By varying the adjustment of the pan to the lower telescoping hopper section, the size of this discharge opening between the hopper and the feed pan may be varied in accordance with the type or size of feed to be dispensed and the position of the pan may also be adjusted in accordance with the age and size of the chickens or fowl to be fed.

Further objects are to provide a construction of maximum simplicity, efficiency, economy and ease of assembly and operation, and such further objects, advantages and capabilities as will later more fully appear and are inherently possessed thereby.

In the drawing:

Figure 1 is a view, part in side elevation and part in vertical cross section, of the hanging feeder assembled and in its suspended, operative position.

Fig. 2 is a top plan view of the assembled feeder.

Fig. 3 is a view, part in side elevation and part in vertical cross section, of the disassembled or collapsed feeder made ready for shipping or storage.

Fig. 4 is a fragmentary enlarged view of the assembled feeder with the telescoping sections extended to a hopper for receiving and supplying the contained feed to the dispensing pan or base of the feeder, and showing the manner of interlocking or interengaging the frusto-conical telescoping sections of the hopper and the manner of suspending the pan from the lower of the telescoping sections.

Fig. 5 is an enlarged view in vertical cross section taken in a plane represented by the line 5—5 of Fig. 4 and viewed in the direction of the arrows.

Referring to the disclosure in the drawing and more particularly to the novel embodiment selected to illustrate the present invention, the disclosed hanging feeder comprises a hopper 10 formed of telescoping sections 11 and 12 each of substantially frusto-conical shape and open at their opposite ends, with the upper section 11 of smaller maximum diameter than the lower section 12. A pivotally mounted bail 13 on the upper section is adapted to be suspended and supported from a hook, catch or other support in a poultry house or wherever the feeding device is to be mounted.

To interlock and retain the telescoping sections in extended position as in Fig. 1, the upper smaller section 11 is provided with an external bead or rolled seam 14 at its lower end and the lower, larger section 12 is provided with an internal bead or rolled seam 15 at its upper end and spaced from and below this bead with circumferentially spaced detents or dimples 20, whereby as the upper section 11 is elevated or extended its bead 14 rides over the detents 20 and is retained between the latter and the bead 15 of the lower section 12, so that the sections 11 and 12 interlock and the assembly retained extended. By providing the opposite ends of the sections 11 and 12 with a bead or rolled seam at 16 and 17, substantial rigidity is accorded these sections which are preferably formed of sheet steel with the ends joined by a longitudinal seam at 18, although these sections may be formed of any rigid material suitable for the purpose.

A pan or dished receptacle 19 for receiving feed by gravity from the hopper 10 is suspended below the open lower end 17 of the lower section 12. As shown, this lower end is spaced from the annular, substantially flat portion or base 21 of the pan and spaced inwardly a substantial distance from the encompassing outwardly and upwardly inclined rim or flange 22. Inwardly of the annular flat portion or base 21 of the pan, there is provided a conical or domed central portion 23 for directing the contained feed or grit 24 outwardly toward the outwardly and upwardly inclined rim or flange 22 and into the annular space or trough 25 from which the chickens or fowl may feed.

To retain the pan 19 suspended from the lower frusto-conical section 12 of the hopper 10, the pan is provided with a plurality of suitably spaced latch members or fasteners 26 each pivotally mounted at its lower end in a bracket 27 affixed or secured in a recessed or depressed portion of the base portion 21, and with the free end 28 bent to provide a hook adapted to enter one of a plurality of apertures or slots 29 in the side wall of the lower section 12 adjacent to but spaced from and above its rolled seam 17. As shown in Fig. 2, there are shown three latch members or fasteners 26 equally spaced apart and in Fig. 5 a like number of sets of these apertures or slots 29 similarly spaced apart, with an aperture or slot of each set adapted to be aligned with a latch member or fastener 26 to permit the pan or dished receptacle 19 to be suspended at different heights from the lower edge or end 17 of the hopper 10 and thereby control the quantity of feed 24 that may flow therebetween from the hopper 10.

Although the illustrative embodiment shown in Figs. 2, 3 and 5, is provided with three equally spaced latch members or fasteners 26 and with three sets of apertures or slots 29 with each set comprising three apertures or slots each provided at a different elevation in the lower section 12 of the hopper 10, it is to be understood that each set may consist of any desired number of vertically spaced apertures or slots for giving any desired adjustment and spacing between the lower edge of the hopper and the base or bottom of the pan for discharge of the feed. Furthermore, any suitable number of latch members or fasteners and a similar number of sets of apertures or slots for receiving these latch members or fasteners, may be provided.

By forming the hopper 10 of frusto-conical form, the danger of clogging of the feed or grit 24 in its passage to the pan or dished receptacle 19 is eliminated. Furthermore, by making the size of the discharge space or opening between the lower end of the hopper and the adjacent portion of the pan adjustable, and by sloping the bottom of the pan outwardly from the center of the hopper, feed, grit or other substance to be fed will positively flow and in controlled quantity from the hopper into the annular space or trough 25 of the pan 19.

As the pan or dished receptacle 19 may be suspended at any desired elevation relative to the floor, the present feeder permits easy cleaning of litter from the floor without moving the feeder and the pan may be disposed for easy reach of substantially all ages of chickens or fowl. The hopper being filled from the top and the feed issuing from the annular space between the lower end of the hopper and the bottom of the pan in accordance with the quantity of feed remaining in the annular trough 25, the chickens will first eat or clean up the old feed in the trough of the pan, whereupon a fresh supply of feed is fed automatically by gravity to the pan. As clearly shown in the drawings, the upper edge of the rim 22 of the feed pan 19 is provided with an inturned or inwardly projecting bead providing a feed saving roll 30 for preventing the chickens or birds from billing-out and wasting feed.

When the telescoping sections 11 and 12 and the pan 19 are collapsed or disassembled for shipping or storage, the pivotally mounted latch members or fasteners 26 are folded outwardly and retained against the outwardly inclined rim 22 of the pan or receptacle 19 and are retained thereat in the position shown in Fig. 3.

Having thus disclosed the invention, I claim:

1. A hanging feeding device for chickens and the like comprising a hopper of frusto-conical shape for containing the feed to be dispensed and open at its upper and lower ends, said hopper adjacent its lower end provided with multiple sets of apertures in and spaced about the circumference of the hopper and with the apertures of each set arranged at different elevations, means connected to the upper end of the hopper for suspending the feeding device, a pan disposed below and spaced from the lower open end of said hopper and having a trough surrounding said lower open end for receiving feed automatically fed to the pan from the hopper by gravity, a plurality of latch members pivotally mounted at their lower end in the bottom of the trough of the pan and in spaced relation and at their upper end provided with a hook with the hook of each latch member detachably received in an aperture of one set to thereby support and suspend the pan from the hopper in adjusted elevated position and in spaced relation with the lower end of the hopper to provide a passage therebetween for the flow by gravity of feed from the hopper to the pan and into its trough, each of said latch members being swingable from an unlatched to a latched position in which its hook is received in an aperture to thereby suspend the pan from the hopper.

2. A chicken feeder adapted tot be suspended above the floor of a poultry house and the like, comprising a hopper for containing the feed to be dispensed and open at its upper and lower ends, said hopper adjacent its lower end provided with multiple sets of apertures in and spaced about the circumference of the hopper and with the apertures of each set arranged at different elevations, a pan disposed below and spaced from the lower open end of said hopper and having a trough surrounding said lower open end for receiving feed automatically fed to the pan from the hopper by gravity, a plurality of latch members each pivotally mounted at one end in the pan and provided with a hook with the hook of each latch member adapted to be detachably received in an aperture of one set whereby when a hook of each latch member is received and anchored in a similarly located aperture of one of the multiple sets of apertures, the pan is held suspended from the hopper in a substantially horizontal position.

3. A chicken feeder adapted to be suspended above the floor of a poultry house and the like, comprising a hopper open at its upper and lower ends, a dished pan having a rim of substantially greater diameter than the lower end of the hopper with the rim of the pan spaced from and providing a feeding trough encompassing the lower end of the hopper, and means for detachably and adjustably mounting and suspending the pan from the lower end of the hopper with the bottom of the pan spaced from said lower end of the hopper to provide a passage therebetween for the flow of feed by gravity from the hopper into the feeding trough of the pan, said means including spaced latch members pivotally mounted at their lower end in the bottom of the pan and at their upper end provided with latching means for detachably connecting the pan to and suspending it from the hopper, said hopper having multiple sets of similarly arranged apertures with the apertures of each set vertically spaced and arranged in staggered relation and with the apertures of each set horizontally aligned with those of an adjacent set whereby when the latching means on the upper end of each latch member is received and latched in aligned apertures, the pan is retained suspended by said latch members from the lower end of the hopper.

References Cited in the file of this patent

UNITED STATES PATENTS

| | | |
|---|---|---|
| 1,078,853 | Heath | Nov. 18, 1913 |
| 1,106,547 | Crabill | Aug. 11, 1914 |
| 1,114,892 | Lawlor | Oct. 27, 1914 |
| 1,131,491 | Drake | Mar. 9, 1915 |
| 1,707,841 | Broadfoot | Apr. 2, 1929 |
| 1,790,045 | Harvey | Jan. 27, 1931 |
| 2,277,420 | Stanfield | Mar. 24, 1942 |
| 2,438,080 | Meeteren | Mar. 16, 1948 |
| 2,522,634 | Pittenger | Sept. 19, 1950 |
| 2,660,150 | Kalb | Nov. 24, 1953 |